United States Patent
Ahmed et al.

(10) Patent No.: US 8,611,957 B2
(45) Date of Patent: Dec. 17, 2013

(54) METHOD AND APPARATUS FOR CONFIGURATION OF A DEVICE PERSONALITY BASED ON MOBILE DEVICE IDENTITY MODULE

(75) Inventors: Farhad Ahmed, Ottawa (CA); Asif Hossain, San Jose, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/102,290

(22) Filed: May 6, 2011

(65) Prior Publication Data

US 2011/0275411 A1 Nov. 10, 2011

Related U.S. Application Data

(60) Provisional application No. 61/332,443, filed on May 7, 2010.

(51) Int. Cl.
*H04B 1/38* (2006.01)
(52) U.S. Cl.
USPC .......................................... 455/558
(58) Field of Classification Search
USPC .......................................... 455/558
See application file for complete search history.

(56) References Cited

U.S. PATENT DOCUMENTS

| | | | |
|---|---|---|---|
| 6,226,527 B1* | 5/2001 | Dalsgaard et al. | 455/553.1 |
| 7,092,716 B2 | 8/2006 | Nizri et al. | |
| 2005/0086328 A1 | 4/2005 | Landram et al. | |
| 2007/0019060 A1 | 1/2007 | Suzuki | |
| 2007/0298775 A1 | 12/2007 | Patzer et al. | |
| 2009/0104939 A1* | 4/2009 | Lee | 455/558 |
| 2009/0131054 A1* | 5/2009 | Zhang | 455/436 |

OTHER PUBLICATIONS

International Search report and The Written Opinion of the International Searching Authority mailed Jan. 9, 2012, in corresponding PCT patent application No. PCT/US11/35566.

* cited by examiner

*Primary Examiner* — Charles Appiah
*Assistant Examiner* — Natasha Cosme
(74) *Attorney, Agent, or Firm* — Novak Druce Connolly Bove + Quigg LLP

(57) ABSTRACT

A method and apparatus for configuration of a device personality based on mobile device identity module, the method including checking an identity module on the mobile device for one or more network modes; and configuring the personality of the mobile device based on results of the checking step.

19 Claims, 5 Drawing Sheets

METHOD AND APPARATUS FOR CONFIGURATION OF A DEVICE PERSONALITY BASED ON MOBILE DEVICE IDENTITY MODULE

RELATED APPLICATIONS

The present application claims priority to U.S. provisional application No. 61/332,443, filed May 7, 2010, the entire contents of which are incorporated herein by reference.

FIELD OF THE DISCLOSURE

The present disclosure relates to multi-mode devices and in particular to the personality of multi-mode devices.

BACKGROUND

In current systems, multi-mode software can have only a single personality. The personality, for example, may be a 3GPP personality for 3GPP only products, or a CDMA or global personality for a CDMA only or multi mode products. The personality is configured during device manufacturing and once set is static for the device.

The personality of the device indicates various configurations or functionality of the device, including configuration of a user interface. The user interface may be changed based on the device type to provide for functionality of the device type. For example, functions which may be present based on a 3GPP personality may or may not be present for a CDMA personality and this may be reflected in the user interface presented to a user or in limitations of application functionality.

BRIEF DESCRIPTION OF THE DRAWINGS

The disclosure will be better understood with reference to the drawings, in which.

DETAILED DESCRIPTION OF THE DRAWINGS

Figure 1:
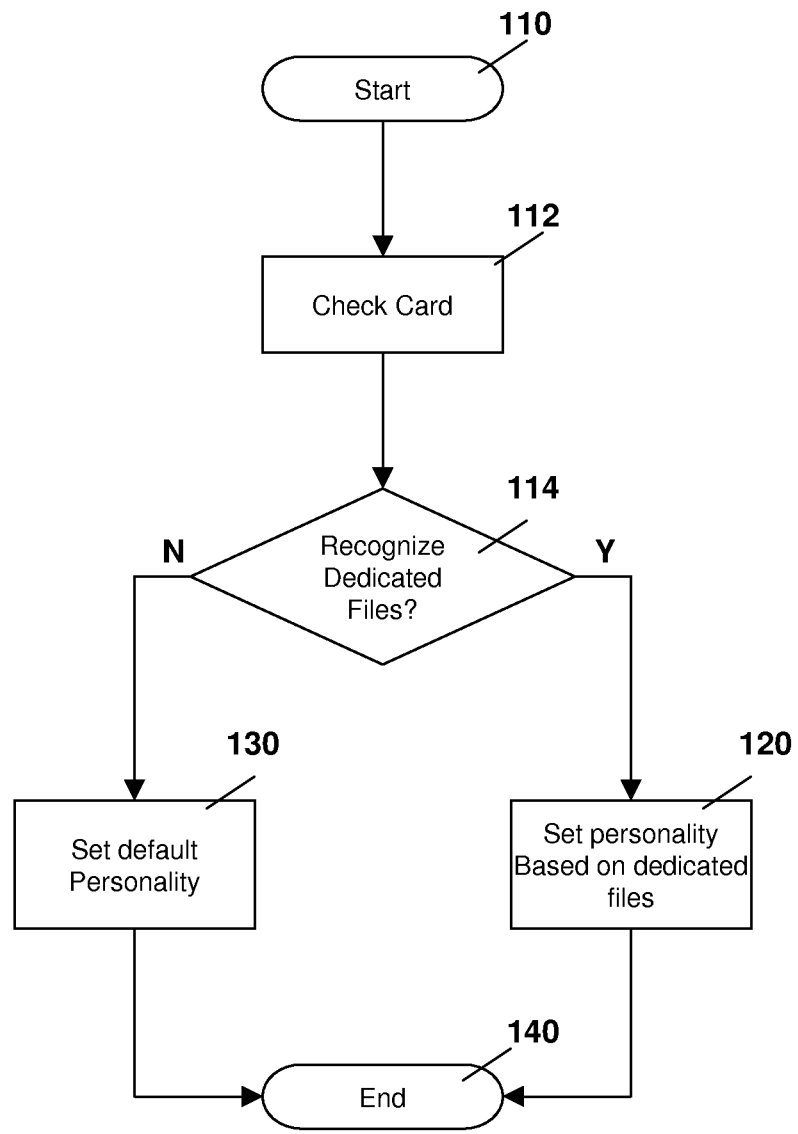
FIG. 1 is a flow diagram showing the configuration of a personality on a mobile device.

The present disclosure provides a method on a mobile device comprising: checking an identity module on the mobile device for one or more network modes; and configuring a personality of the mobile device based on results of the checking step.

The present disclosure further provides a mobile device comprising: a processor; and an identity module, wherein the processor and identity module cooperate to: check the identity module on the mobile device for one or more network modes; and configure a personality of the mobile device based on results of the checking step.

The present disclosure still further provides a method on a mobile device comprising: checking a universal integrated circuit card in the mobile device for one or more network modes; and configuring a personality of the mobile device based on results of the checking step.

A mobile device, also sometimes referred to as a user equipment, mobile data device, personal digital assistant, among others, may have a removable card that provides an identity for connecting with a network. For example, a third generation partnership project (3GPP) phone utilizing a global system for mobile communications (GSM) specification, may have a subscriber identity module (SIM) on a removable SIM card. The SIM card will store an international mobile subscriber identity (IMSI) to identify the subscriber on mobile telephone devices. This allows a user to change between one GSM phone and another simply by removing the SIM card and placing it into the other phone. The new device will then be identified by the network and system access and billing can occur as normal for the user.

Similarly, in a third generation Universal Mobile Telecommunications System (UMTS) device a Universal Subscriber Identity Module (USIM) card may be used to provide the functionality of a SIM. In one embodiment, the USIM is part of a Universal Integrated Circuit Card (UICC). As will be appreciated by those in the art, the UMTS standard is also a 3GPP standard.

Under Code Division Multiple Access (CDMA) standards, originally non-volatile memory was used to store user identity. However, a removable user identity module (RUIM) was developed for CDMA handsets that extends the GSM SIM card functionality to CDMA phones. The RUIM provides the user of a CDMA phone with the ability to transfer their identity between CDMA phones, thus providing benefits of the GSM SIM card to CDMA standards.

A CDMA Subscriber Identify Module (CSIM) has superseded the RUIM card in some CDMA devices. It may form part of a UICC card. The CSIM may also be a part of a UICC.

A multi-mode device may accept a card such as a UICC which may provide SIM, USIM, RUIM, CSIM or similar identity module functionality for a device. Such an identity module may have Dedicated Files (DF) providing directories for the various subscription types. For example, a dedicated file with file ID 7F20 is a GSM or 3GPP DF, and a file ID 7F25 indicates a CDMA DF. The present disclosure is however not limited to GSM and CDMA and the protocol or network mode may be any protocol or network mode. The terms protocol and network mode are used interchangeably herein.

Traditionally, multi-mode software had only a single personality, which was set during device manufacturing. Thus, for example, a piece of software which may select the mode of operation on the device may have a pull-down menu with a plurality of network modes. If the phone was set at the factory to be a 3GPP only product, the CDMA options may be removed from the menu. Similarly, if the device was set to the CDMA only, then the GSM or 3GPP options may be removed from the list. If the device was set to a Global personality, then all of the options may be included in the list. This is merely meant as an example, and other options or personalities may be available to users, depending on the various network modes.

Personality may also be seen, for example, in dialing options. For example, a multi-party call in CDMA may allow the initiator of the call to connect to a second party and then connect to a third party. Under CDMA standards, the second party does not have the option of adding a third party for multi-party calling. Conversely, in GSM standards the second party is able to add the third party. Thus, the personality, if set to CDMA, may restrict the user interface on a phone to not allow the user to initiate multi-party calling if the user did not initiate the original call.

Further, there are some voice supplementary services (e.g. explicit call transfer, call barring) that are available in 3GPP but not available in CDMA. In this regard, a 3GPP personality will have user interface (UI) menu options for these services whereas a CDMA personality will not have a similar UI.

Further, unstructured supplementary service data (USSD) is a protocol available to GSM but not CDMA. A device with a 3GPP personality would thus be able to make use of USSD and the UI on the device would, in some embodiments, enable sending of USSD codes. Codes may be sent by having a user manually enter the code, and the UI could prevent USSD codes from being sent when in a CDMA personality.

Alternatively, codes may be sent from within applications. If an application is sending USSD codes, the application, or feature within the application, may be unavailable when a CDMA personality is activated, for example.

Further, CDMA allows only one point to point protocol (PPP) session while GSM allows multiple IP sessions (PDP context). If one PPP session is open on a device with a CDMA personality, other PPP sessions might be restricted. Conversely, with a GSM personality the device could allow multiple PDP contexts.

Other examples of the use of personality would be known to those in the art and, as used herein, personality is meant to indicate various options or user interface configurations that are dependent on the underlying radio technology being utilized from a multi-mode software application.

In accordance with one embodiment of the present disclosure, if a user inserts a card (identity module) that identifies one or more network modes, the present disclosure provides for a method for setting a personality for multi-mode software applications based on the network mode or modes of the identity module.

An identity module may, in one embodiment, use dedicated files to identify network modes. Thus for example, the identity module can be checked to determine whether a dedicated file is included for a CDMA application, a 3GPP application or both. As will be appreciated this is not limiting and in other embodiments, various other technologies could be utilized and the present disclosure is not meant to be limited to 2 or 3 different types of configurations.

For example, if it is determined that the identity module has only 3GPP application, device software can be configured with 3GPP personalities on boot-up. Conversely, if it is determined that the identity module has a CDMA application, the device software can be configured for CDMA personality upon boot-up. Further CDMA personality may or may not indicate a global personality. If a global personality is distinct from a CDMA personality, then the presence of both CDMA and 3GPP applications as shown with dedicated files will allow a global personality to be implemented. Thereafter, depending on the device personality, different software features are exposed to a user. In other examples, personalities might exist for different generations of technology. For example, a network mode of UMTS may provide a distinct personality from a network mode of GSM or Long Term Evolution (LTE), LTE-Advanced (LTE-A), or WiMAX, among others.

Reference is now made to FIG. 1. FIG. 1 shows a flow diagram for a check during the boot up of a device. The process of FIG. 1 starts at block 110 and proceeds to block 112 in which an identity is checked during the boot-up of the device. In block 112 the device checks to see whether or not an identity module such as a card is inserted and whether or not it can read the card.

The process then proceeds to block 114 in which the check of the identity module determines whether any dedicated files indicating network mode are present. If yes, the process proceeds from block 114 to block 120 in which the personality of the device is set based on the network mode or modes that are present.

As used herein, the setting or configuring of the personality provides an indication to software on the device. Such an indication could, for example, be a flag or marker at a memory location that a software application checks before starting. Thus if only two personalities are configurable, a single bit could be toggled in memory, for example, and software on the device that depends on personality could check the bit when the software is started. If more than two personalities are possible then multiple bits or other indicator could be used. In other embodiments, an application launcher could be configured to inform the software of the personality on software launch. In further embodiments, software that is personality dependent may register with a configuration module that dynamically sets personality within the software. Other options to configure the personality would be known to those in the art.

From block 114, if the identity module is not present or not recognized, an error may occur. Alternatively, the process may proceed to block 130 in which a default personality is set for the device.

From blocks 120 or 130, the process proceeds to block 140 and ends. The boot process for the device may continue in one embodiment.

From the above, in block 114, the process may check for the presence of specific directories identified by specific file identifiers. Thus, the check at block 114 may check, for example, to see whether or not there is anything present at file IDs 7f20 and 7f25 and determine whether or not to proceed to block 120 or 130.

The setting of the personality at block 120 could be based on the various types of personalities that exist on the device. In one embodiment, three personalities may exist, including a global personality, a CDMA only personality and a GSM personality. In other embodiments, a CDMA personality may include a global personality, and thus the CDMA personality would be set if any CDMA dedicated file existed, regardless of whether a 3GPP dedicated file also existed. As will be appreciated, this is not meant to be limiting and other personalities could exist on the device, which could be set at block 120.

The default personality set at block 130 could be set at the device manufacture time to form the personality for use without a card or without a recognizable card (for example for emergency operation of the device).

Figure 2:
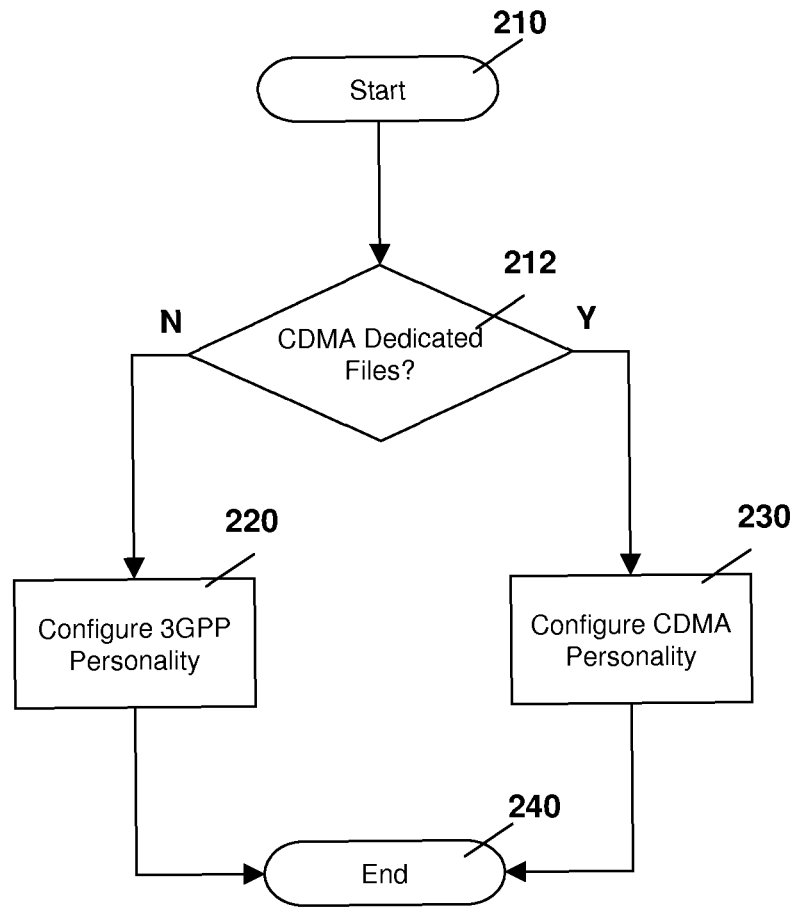
FIG. 2 is a flow diagram showing an embodiment of FIG. 1 in which only two personalities exist.

Referring to FIG. 2, FIG. 2 shows one embodiment of FIG. 1 in which there are only two personalities which can be set. In the example of FIG. 2, the identity module only having a 3GPP application will cause a personality to be a 3GPP personality. Any other applications (as set by dedicated files, for example), including a CDMA application or both CDMA and 3GPP applications, will cause a CDMA personality to be set.

The process of FIG. 2 starts at block 210 and proceeds to block 212 in which a check is made to determine whether an identity module has a CDMA application. As indicated above, this could be by looking at a specific location on the card to determine whether or not dedicated files exist at this location.

The process proceeds from block 212 to block 220 if it is determined that the identity module does not have a CDMA application. At block 220 the device configures a 3GPP personality.

Conversely, from block 212 if the identity module is determined to include a CDMA application, the process proceeds to block 230 in which a CDMA personality is configured at the device.

The process then proceeds from blocks 220 or 230 to block 240 and ends.

As will be appreciated, the process of FIG. 2 may be performed during the boot-up of the device when a check is made to determine the presence of various network modes on an identity module.

Once the personality is configured software on the device may be adapted to reflect the personality. Thus, as indicated above, the user interface of applications on the device may be changed to reflect the functionality permitted or disallowed by the personality. For example, a party receiving a call with a CDMA personality would not be allowed to establish a multi-party call based on CDMA standards.

Figure 3:
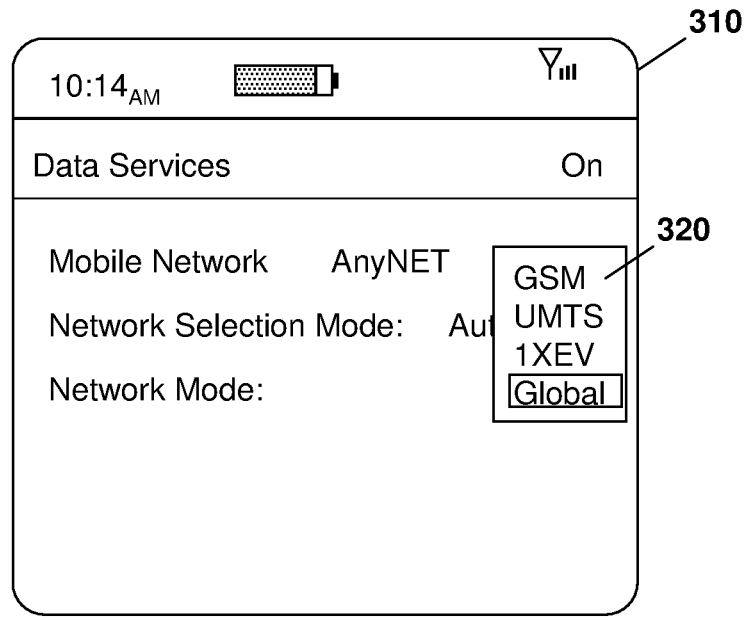
FIG. 3 is a user interface for a mobile device configuration menu where the device has a global personality.

Further, configuration menus could be adapted to reflect only the valid selection options. Reference is now made to FIG. 3. FIG. 3 shows the user interface of a mobile network configuration menu in which a network mode may be selected.

In FIG. 3 user interface 310 provides a selection menu 320 which includes valid options for selection. The embodiment of FIG. 3 has a global personality permitting both 3GPP and CDMA connections. Thus, menu 320 allows the selection of GSM, UMTS, 1XEV (Evolution Data Only under CDMA) or a global configuration.

Figure 4:
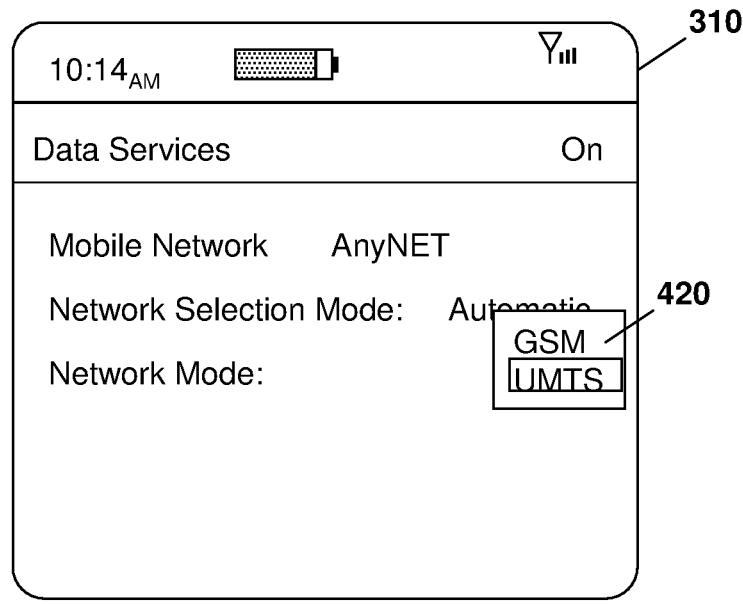
FIG. 4 is a user interface for a mobile device configuration menu where the device has a 3GPP personality.

In FIG. 4 a user interface 310 is provided where the device has a 3GPP personality. In this case, menu 420 reflects only the valid selection options, which in the example of FIG. 4 includes GSM and UMTS.

Figure 5:
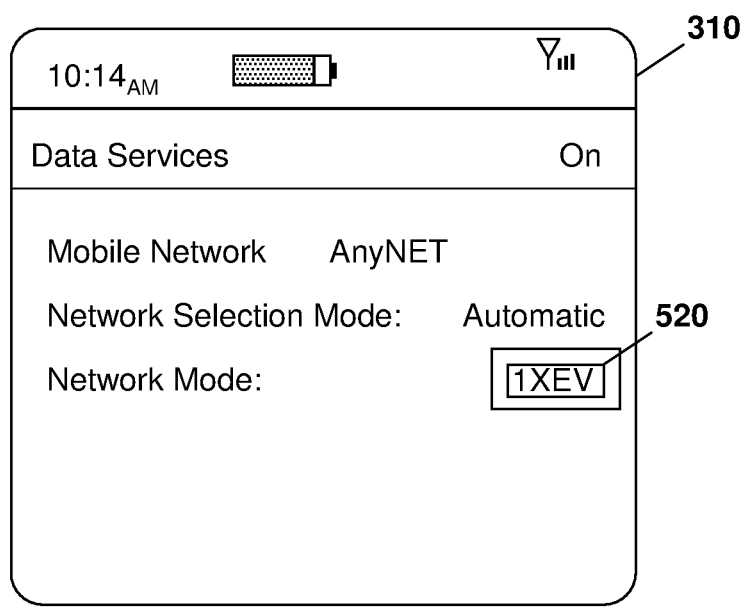
FIG. 5 is a user interface for a mobile device configuration menu where the device has a CDMA personality.

In FIG. 5 user interface 310 provides selection options for a device having a CDMA only personality. In this case, menu 520 includes only a 1XEV option.

FIGS. 3, 4 and 5 show one example of the way a personality may change operation of a device by reflecting only valid selection options based on the personality of the device. The examples, of FIGS. 3, 4 and 5 are not meant to be limiting, and other adaptations of device functions and user interfaces would be evident to those skilled in the art.

The present disclosure is not meant to be limited to the selection of only 3GPP, CDMA or global personalities. Rather, the network mode or protocol that is reflected on an identity module can lead to various personalities. In some cases the personality may be distinct between various 3GPP modes, and thus GSM may have a separate personality from UMTS or from fourth generation or fifth generation technologies such as Long Term Evolution (LTE) or Long Term Evolution Advanced (LTE-A). Similarly, various CDMA technologies may have distinct personalities.

Figure 6:
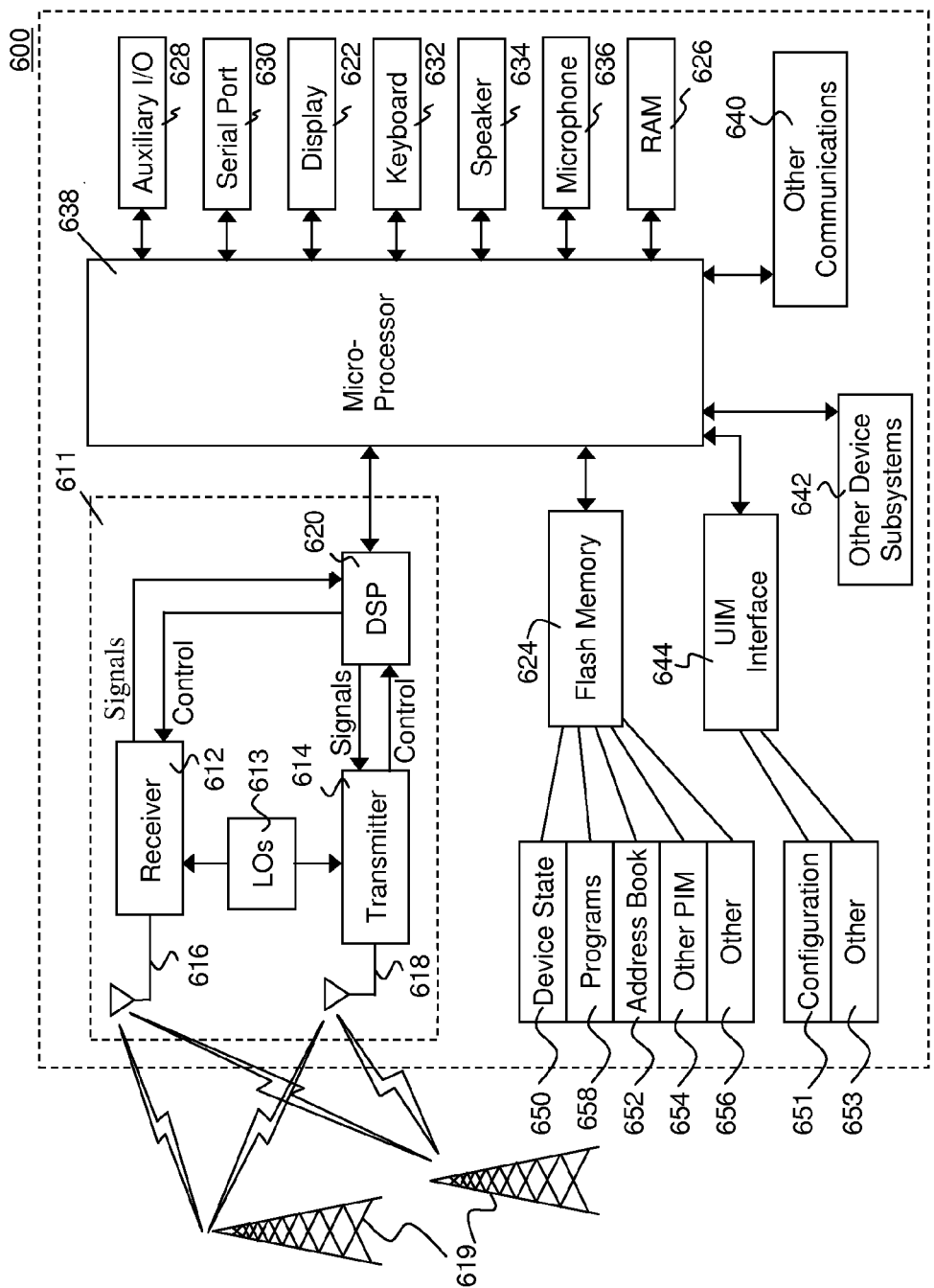
FIG. 6 is a block diagram of an exemplary mobile device.

The above may be implemented on any mobile device. Reference is now may to FIG. 6, which shows an exemplary mobile device capable of being used with the methods described above.

Mobile device 600 is typically a two-way wireless communication device having voice and data communication capabilities. Mobile device 600 may have the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile device 600 is enabled for two-way communication, it will incorporate a communication subsystem 611, including both a receiver 612 and a transmitter 614, as well as associated components such as one or more, embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

Network access requirements will also vary depending upon the type of network 619. A GSM/UMTS device typically has a subscriber identity module (SIM) in order to get full service from the network. A CDMA2000 device may have such access credentials stored in it non-volatile memory or may use a removable user identity module (RUIM) or CSIM in order to operate on a CDMA network. The SIM/RUIM interface 644 is normally similar to a card-slot into which a SIM/RUIM card can be inserted and ejected like a diskette or PCMCIA card. The SIM/RUIM card can hold many key configurations 651, and other information 653 such as identification, and subscriber related information.

When required network registration or activation procedures have been completed, mobile device 600 may send and receive communication signals over the network 619. As illustrated in FIG. 6, network 619 can consist of multiple base stations communicating with the mobile device.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by the DSP 620 and input to transmitter 614 for digital to analog conversion, frequency up conversion, filtering, amplification and transmission over the communication network 619 via antenna 618. The DSP 620 not only processes communication signals, but also provides for receiver and transmitter control. For example, the gains applied to communication signals in receiver 612 and transmitter 614 may be adaptively controlled through automatic gain control algorithms implemented in the DSP 620.

Mobile device 600 generally includes a microprocessor 638 which controls the overall operation of the device. Communication functions, including data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, two or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Microprocessor 638, in addition to its operating system functions, may enable execution of software applications on the mobile device. A predetermined set of applications that control basic operations, including data and voice communication applications for example, can be installed on mobile device 600 during manufacturing. Other applications could be installed subsequently or dynamically.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would have the ability to send and receive data items, via the wireless network 619. In one embodiment, the PIM data items are seamlessly integrated, synchronized and updated, via the wireless network 619, with the mobile device user's corresponding data items stored or associated with a host computer system. Further applications may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the microprocessor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, among others, in conjunction with the display 622 and possibly an auxiliary I/O device 628. Such composed items may then be transmitted over a communication network through the communication subsystem 611.

For voice communications, overall operation of mobile device 600 is similar, except that received signals may be output to a speaker 634 and signals for transmission would be generated by a microphone 636. Alternative voice or audio I/O subsystems, such as a voice message recording subsystem, may also be implemented on mobile device 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method on a mobile device comprising:
   checking an identity module at the mobile device for one or more network modes;
   configuring a personality of the mobile device based on results of the checking step, the personality indicating at least one network mode of the device; and
   configuring a user interface of the device based on the personality, wherein configuring the user interface of the device comprises configuring a graphical user interface of an application on the device based on the personality, and wherein configuring the graphical user interface of the application comprises configuring a user option of the graphical user interface based on the personality.

2. The method of claim 1, wherein the one or more network modes are identified by one or more dedicated files on the identity module.

3. The method of claim 2, wherein each of the one or more dedicated files have a specific file identifier.

4. The method of claim 1, wherein the checking identifies one or more of a Third Generation Partnership Project '3GPP' application and a Code Division Multiple Access 'CDMA' application.

5. The method of claim 4, wherein the configuring of a personality configures a CDMA personality if the checking identifies the CDMA application.

6. The method of claim 4, wherein the configuring of a personality configures a 3GPP personality if no CDMA application is identified by the checking.

7. The method of claim 1, wherein the identity module is selected from the group consisting of a subscriber identity module, a universal subscriber identity module, a removable user identity module, a universal integrated circuit card, and a Code Divisional Multiple Access subscriber identity module.

8. The method of claim 1, wherein the checking and configuring of a personality occur during a boot up of the mobile device.

9. The method of claim 1, further comprising configuring a default personality if the checking does not find one or more network modes.

10. A mobile device comprising:
a processor; and
an identity module, wherein the processor and identity module cooperate to:
check the identity module at the mobile device for one or more network modes;
configure a personality of the mobile device based on results of the checking step, the personality indicating at least one network mode of the device; and
configure a user interface of the device based on the personality, wherein configuring the user interface of the device comprises configuring a graphical user interface of an application on the device based on the personality, wherein configuring the graphical user interface of the application comprises configuring a user option of the graphical user interface based on the personality.

11. The mobile device of claim 10, wherein the one or more network modes are identified by one or more dedicated files on the identity module.

12. The mobile device of claim 11, wherein each of the one or more dedicated files have a specific file identifier.

13. The mobile device of claim 10, wherein the checking identifies one or more of a Third Generation Partnership Project '3GPP' application and a Code Division Multiple Access 'CDMA' application.

14. The mobile device of claim 13, wherein the configuring of a personality configures a CDMA personality if the checking identifies the CDMA application.

15. The mobile device of claim 13, wherein the configuring of a personality configures a 3GPP personality if no CDMA application is identified by the checking.

16. The mobile device of claim 10, wherein the identity module is selected from the group consisting of a subscriber identity module, a universal subscriber identity module, a removable user identity module, a universal integrated circuit card, and a Code Divisional Multiple Access subscriber identity module.

17. The mobile device of claim 10, wherein the checking and configuring of a personality occur during a boot up of the mobile device.

18. The mobile device of claim 10, wherein the processor and identity module further cooperate to configure a default personality if the checking does not find one or more network mode applications.

19. A method on a mobile device comprising:
checking a universal integrated circuit card on the mobile device for one or more network modes;
configuring a personality of the mobile device based on results of the checking step, the personality indicating at least one network mode of the device; and
configuring a user interface of the device based on the personality, wherein configuring the user interface of the device comprises configuring a graphical user interface of an application on the device based on the personality, and wherein configuring the graphical user interface of the application comprises configuring a user option of the graphical user interface based on the personality.

* * * * *